Jan. 23, 1951 L. L. POURCIAU ET AL 2,539,374

VERTICAL SYNCHRONIZATION PULSE SEPARATION CIRCUIT

Filed July 23, 1949 3 Sheets-Sheet 1

Inventors
LOUIS L. POURCIAU
RICHARD W. LEE
By
H. A. Mackey
Attorney

VERTICAL SYNCHRONIZATION PULSE SEPARATION CIRCUIT

Filed July 23, 1949 3 Sheets-Sheet 2

Inventors
LOUIS L. POURCIAU
RICHARD W. LEE
By H. L. Mackey
Attorney

VERTICAL SYNCHRONIZATION PULSE SEPARATION CIRCUIT

Filed July 23, 1949 3 Sheets-Sheet 3

Inventors
LOUIS L. POURCIAU
RICHARD W. LEE
By H. L. Mackey
Attorney

Patented Jan. 23, 1951

2,539,374

UNITED STATES PATENT OFFICE 2,539,374

VERTICAL SYNCHRONIZATION PULSE SEPARATION CIRCUIT

Louis L. Pourciau and Richard W. Lee, Pleasantville, N. Y., assignors to General Precision Laboratory Incorporated, a corporation of New York Application July 23, 1949, Serial No. 106,404

4 Claims. (Cl. 178—7.3)

This invention relates to a television synchronization separation circuit and more particularly to an improved circuit for separating the vertical synchronization signal from the signal containing both vertical and horizontal synchronization pulses.

In the operation of a television receiver the vertical synchronization signal must be isolated from picture and the horizontal and vertical synchronization signals. The separation should be complete, the time of the front edge or other definite part of the vertical circuit synchronization signal should be accurately reproduced and the circuit should be immune to false operation by extraneous signals. Circuits presently used leave much to be desired in accuracy of timing and are affected by extraneous signals.

Such extraneous signals, frequently termed "noise," interfere with the operation of vertical synchronization separation circuits by causing jitter or small momentary shifts in the location of the picture in its frame, or by causing momentary loss of synchronization resulting in the picture as seen on the receiver screen "slipping" vertically.

Lack of precision in the timing of vertical synchronizing pulses causes random changes in the time of starting of each vertical scan, resulting in variations in interlace, so that occasionally the 262½ lines of one scan do not fall precisely between the 262½ lines of the preceding scan, and they may even fall on top of the lines of the preceding scan. Then there is momentarily a 50% loss in vertical picture definition and additionally the horizontal lines become visible and deface the picture by imposing a horizontal grill upon it.

The present invention consists of an electron double gate that remains locked closed except during the vertical synchronization pulse interval and that during such intervals is unlocked for passage of current only for the duration of selected serrations therein. The double gate consists of a coincidence tube together with several differentiating and integrating circuits that in effect exclude abnormal signals, filter out and separate the several components of the normal signal, and present the components to control grids of the coincidence tube.

The instant invention attains high precision in the timing of the vertical synchronization pulse so that this usuel cause of loss of interlace is completely eliminated. The circuit also has excellent discrimination against both ordinary impulse noise and random noise, so that jitter and loss of vertical synchronization become virtually impossible.

The purpose then of this invention is to provide a television receiver circuit unaffected by noise for the isolation of vertical synchronization signals and for the generation therefrom of accurately timed pulses.

The exact nature of this invention will be more clearly apparent from the following detailed description when taken together with the attached drawing, in which.

Figure 1:
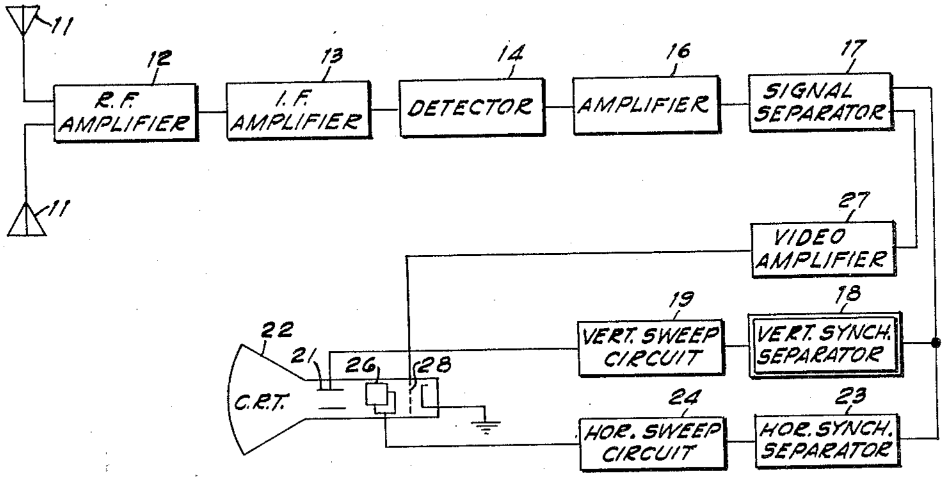
Figure 1 is a simplified block diagram of a complete television receiver incorporating the circuit to which the instant invention is particularly directed.

In Fig. 1 a complete television receiver incorporating the features of the invention is illustrated in block form with the block that is illustrative of the instant invention enclosed in a double rectangle. By this means the manner in which the circuit of the invention co-operates with and is connected to the more conventional elements of a television receiver can be more readily ascertained.

Referring first to this simplified illustration, television signals are received by an antenna 11 and amplified by a radio frequency amplifier 12 and intermediate amplifier 13 in the usual manner. The output of the intermediate amplifier is impressed on a second detector 14 which demodulates the intermediate frequency signal wave and produces a wave which is a composite of the picture signals and synchronizing signals as is well understood in the art. The output of the detector 14 consisting of this composite signal is impressed on the input of an amplifier 16, where the signal is amplified, is mixed with direct current and is inverted. The amplified inverted composite signal output of the amplifier 16 is impressed on the input of a signal separator 17 which separates the video signal from the vertical and horizontal synchronizing signal pulses. One circuit for performing the functions of this signal separator 17 and those of the amplifier 16 is described in the copending application Serial No. 78,434 filed February 25, 1449, of Crane et al., so that this portion of the circuit will not be further described.

The composite synchronizing signal which is one of the outputs of the signal separator 17 is the input to a vertical synchronization separation circuit 18, which constitutes the subject of this invention. This circuit segregates the vertical synchronization signal, ignoring the horizontal signal, and produces from the periodic vertical synchronization signal what may be termed marking pulses, the front edge of each pulse being strictly representative of the time of occurrence of a specific part of each vertical synchronization signal block.

Each of these marking pulses is used to trigger a vertical sweep circuit.

The vertical sweep circuit 19 is triggered by the vertical synchronization separation circuit 18, and may be of any type such as, for instance, the type described in the copending application Serial No. 99,508, filed June 16, 1949, of Hodder et al. The sawtooth wave form potential emitted by this circuit is employed to apply the appropriate potentials to the vertical deflecting electrodes 21 of a cathode ray picture tube 22, on the screen of which the television picture is exhibited.

Horizontal synchronization signals are separated by the circuit 23 from the composite synchronizing signals emitted by the signal separator circuit 17, and are used to trigger a horizontal sweep circuit 24. This horizontal sweep circuit applies the appropriate potentials to horizontal deflecting electrodes 26 to control the horizontal sweep motions of the cathode ray picture tube 22. At the same time the picture signals, after being amplified by the video amplifier 27 are applied to a control electrode 28 controlling the instantaneous brightness of the cathode ray beam as is well understood in the art.

Figure 2:
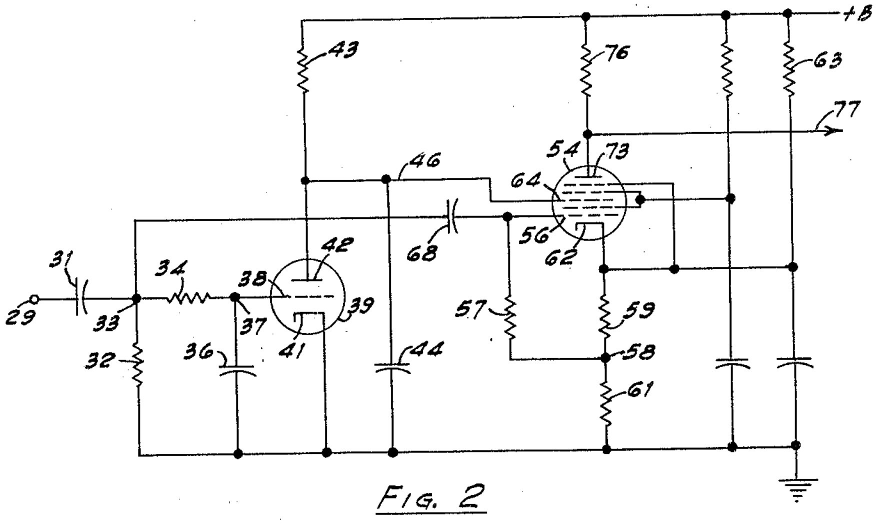
Figures 2 and 9 show schematically two embodiments of the vertical synchronization separation circuit of this invention.

The circuit 18 for vertical synchronizing signal separation is shown in more detail in Fig. 2, in which signals of about 5 volts peak-to-peak potential from the signal separator circuit 17 of Fig. 1 are received at terminal 29. These signals have the form illustrated in Figs. 3 and 4, in which the depicted vertical synchronizing pulse interval is that portion of the signal which is to be isolated and utilized by the vertical synchronization separation circuit forming the subject of this application. The interval marked "H" is the horizontal synchronizing period of 1/15,750 second, and the vertical synchronizing period or field of $\frac{1}{60}$ second is the time from any part of the depicted vertical synchronizing pulse interval to the same part of the succeeding vertical synchronizing pulse interval. The vertical blanking time includes the vertical synchronizing pulse interval, preceded and succeeded by an equalizing pulse interval. During these three intervals pulses occur at double the horizontal pulse frequency.

Those which occur during the equalizing intervals have a length of about 2½ microseconds and are termed equalizing pulses, while those which occur during the vertical synchronizing pulse interval have a length of about 4 microseconds and are here termed serrations. Both of these kinds of pulses are therefore slightly shorter than the 5 microsecond horizontal synchronizing pulses transmitted during the picture interval.

The input signal received at the terminal 29 of Fig. 2 is applied to an isolating condenser 31 to remove direct-current components. It is followed by the grid leak resistor 32, necessary for proper bias of the following triode tube as will be described later. The time constant of the condenser and resistor is large enough for the combination to have no differentiating action, and the wave form at the output junction 33 of the resistance-condenser combination is therefore still that illustrated in Figs. 3 and 4.

Figures 3, 4, 5, 6, 7, 8:
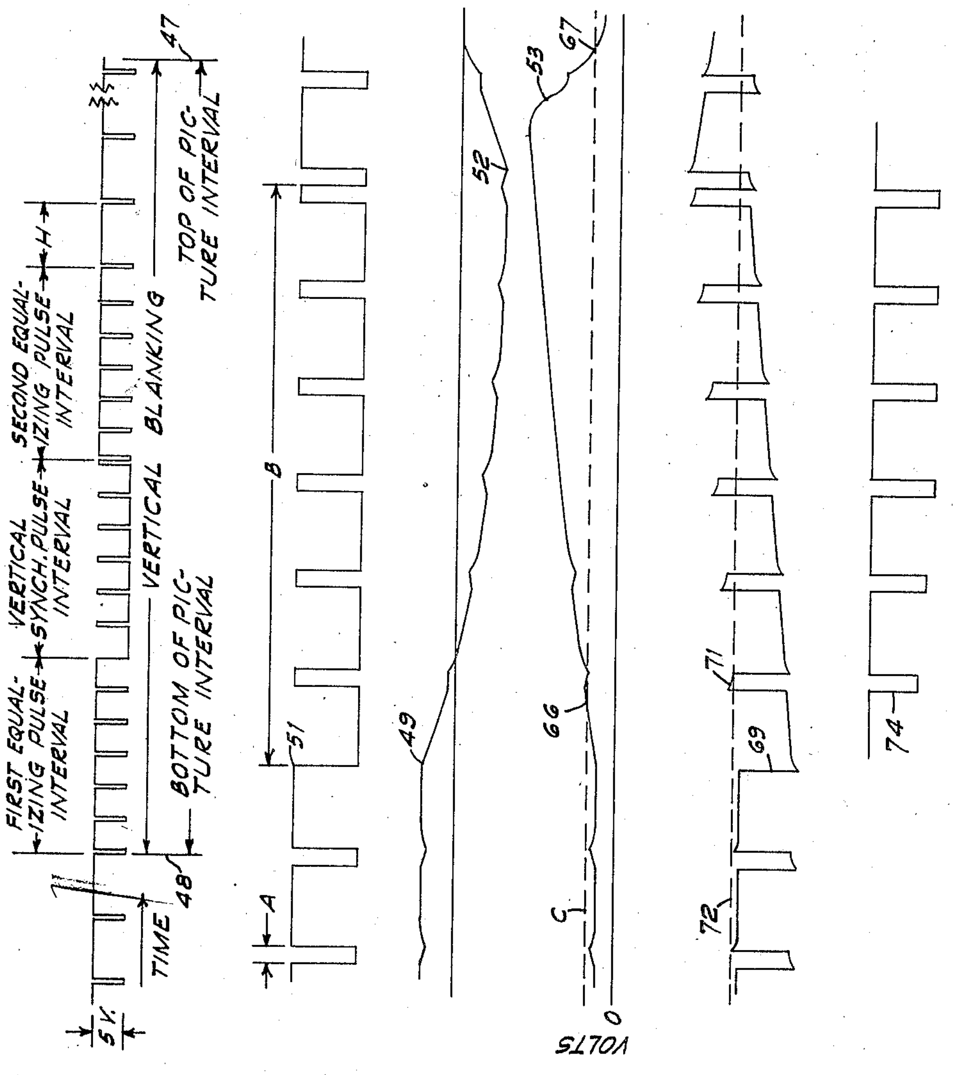
Figure 3 illustrates the wave form of the signal applied to the circuit of this invention.
Figure 4 is a large-scale reproduction of part of Fig. 3.
Figure 5 is a curve of the potential applied to the triode grid in the circuit of Fig. 2.
Figure 6 is a curve of the triode plate potential in the circuit of Fig. 2.
Figure 7 is a curve of the control grid potential of the multigrid tube in the circuit of Fig. 2.
Figure 8 illustrates the pulse output form obtained in the circuits of Figs. 2 and 9.

Resistors 32 and 34 together with condenser 36 form an integrating resistance-capacity network having a time constant that is long compared to the width of an equalizing pulse A in Fig. 4, but that is small enough compared to the duration of a vertical synchronizing pulse interval B, Fig. 4, to allow a substantial change of potential at the output junction 37, Fig. 2, during such an interval. This resistance-capacity network is energized at the junction 33 and integrates the energizing wave form to that depicted in Fig. 5 having a reference potential level determined by the size of the resistor 32.

The output junction 37 is directly connected to the control grid 38 of a triode 39, the cathode 41 of which is connected to ground and the anode 42 of which is connected to a source of positive potential through a resistor 43. A condenser 44 is connected between the anode 42 and ground and together with the anode resistor 43 in series therewith forms a timing circuit. This timing circuit has an integrating effect on signals received by the conductor 46 from the anode 42, but this integrating effect is selective, operating only on increasing potential of the anode 42. The potential of the anode 42 decreases by reason of the current flow through the anode resistor 43, which produces a drop therein, however, such current flows only when the tube 39 is conductive, that is, when its resistance is relatively low, and when this is the case the internal tube resistance acts as a low resistance shunt on the condenser 44, with the result that the circuit acts as if the condenser 44 were short-circuited. On the other hand, the potential of the anode 42 rises only because the tube current has decreased or when the tube 39 has ceased entirely to conduct. That is to say, the tube impedance has become very high or infinite so that it has no effect on the operation of the condenser 44 in shunt therewith, and the integrating circuit composed of this condenser and resistor 43 therefore integrates all rising potentials to produce a gently up-sloping potential curve. The time constant of this circuit is long compared to the length of a serration, and is comparable to the length of a vertical pulse interval B, Fig. 4, so that a wave form as illustrated in Fig. 6 is produced having a slowly rising relatively smooth characteristic.

During that part of a vertical period when video signals are being received as from the time 47, Fig. 3, to time 48 nearly 1/60 second later, the general average of potential of the grid 38 of the triode 39 is positive, the tube is continuously conductive, and the potential of its anode 42 is not much above ground potential. This is graphically indicated in Fig. 5 by the level of the curve preceding the time 49 indicating that the triode grid is positive, and by the curve of Fig. 6 at the left indicating that the triode anode potential is only slightly above zero. At the time of the beginning of the vertical pulse interval, the input potential at the junction 33 suddenly falls, as depicted at 51 in Fig. 4. However, the integrating effect of the triode input network consisting of resistors 32 and 34 and condenser 36 converts this sudden fall to the gradual decrease shown in Fig. 5 beginning at time 49, indicating a gradual decrease of grid potential continuing to the time 52, when at the termination of the pulse interval B the grid potential commences to rise just as slowly. The corresponding anode potential change, being of opposite phase in any discharge tube, is depicted in Fig. 6 with an augmented smoothness of curvature contributed by the integration effect of the anode output network consisting of the resistor 43 and condenser 44. At the termination of the vertical pulse interval, however, when the grid potential begins to increase, and as soon thereafter as the grid potential has increased sufficiently to permit some tube conduction, the condenser 44 becomes short-circuited thereby, the anode current increases and the anode potential falls, entirely free of any integrating effect of the anode network. This is indicated by the sharp fall 53 in Fig. 6 commencing soon after the time 52 of Fig. 5.

The triode 39 is followed by a gating or coincidence tube 54 which is arranged for coincidental control of its anode output potential by its first and third grids. This tube may be of any multigrid type that is designed for control by more than one grid, such as the 6BE6. The first grid 56 is held below cutoff in absence of signal by a bias connection through a resistor 57 to the junction 58 of two cathode resistors 59 and 61 in series. In order to secure the desired bias potential the cathode 62 of the tube 54 is connected to the source of positive B potential through a resistor 63, causing a small current flow at all times through the cathode resistors with a corresponding potential drop across them. The third grid 64 of the tube 54 is connected directly to the anode 42 of the triode 39, insuring a positive bias in absence of a signal. The multigrid tube 54 therefore has no current flow in the absence of an input signal because of the fixed bias on its first grid 56.

When television signals are being received, the multigrid tube 54 third grid 64 is held below cutoff at all times except during part of the vertical synchronizing pulse interval, as illustrated in Fig. 6. At the beginning of a vertical synchronizing pulse interval the potential of the triode anode 42 and therefore of the tube 54 grid 64 begins to rise, and at the point 66, Fig. 6, crosses the dashed line C representing the cutoff point of the grid 64. From this time until the time 67 this grid does not prevent current flow in the tube 54.

The first grid 56 of the tube 54 is actuated by signals secured from the input junction 33 through a condenser 68 that has two functions; it separates the grid 56 from the triode grid 38 in a direct-current sense so that the two grids may be given different fixed biases, and the condenser 68 also acts together with the resistors 57, 59, 61 and 63 as a differentiating network. The time constant of this differentiating network is made large in relation to the duration of a serration but small in relation to the duration of a vertical synchronization pulse interval. As a result of the insertion of such a differentiating network, signals of the form illustrated in Fig. 4 that are applied to the condenser 68 are to an extent differentiated so that they are delivered to the first grid 56 of tube 54 in the form illustrated in Fig. 7. In this form the serrations are practically unchanged, their tops being slightly peaked but their sides remaining vertical. The front edge 69 of the vertical synchronization pulse interval is unchanged, but the floor of the interval is gradually raised, carrying the serrations up with it so that each is higher than the preceding one. In Fig. 7 the first serration 71 is high enough to rise above the cutoff potential 72 of the grid 56.

In order for the tube 54 to conduct, both the first and third grids must be above cutoff. As shown in Figs. 6 and 7, this occurs only during the interval between the times 66 and 67, Fig. 6, and within this interval only during the individual serrations that rise above the cutoff line 72 in Fig. 7. The resulting anode 73 potential changes are depicted in Fig. 8 as negative pulses each having the width of a serration. The first of these pulses 74, is shown as somewhat shorter than the following pulses because at the time of its occurrence the potential of the third grid 64 has not risen high enough to permit full anode current to flow, so that the full potential drop through the anode resistor 76 is not developed. However, this pulse is sufficiently strong to permit its employment as the triggering pulse, and it is transmitted through the conductor 77 to the succeeding circuit 19, Fig. 1. The time of the rise or front face of this pulse bears a definite relation to the time of beginning 51 Fig. 4, of the vertical pulse interval, so that its employment to start the vertical retrace results in a retrace that is as accurately timed as if the front edge of the vertical scan interval itself were used. Of course, by appropriate adjustment of constants a serration succeeding the first may be employed with the same precise results. The practical result in any event is that visible imperfection of interlace is made impossible.

The use of the differentiating network consisting of condenser 68 and its associated resistors is not absolutely essential as the television signal may be applied directly to the grid 56 without first being differentiated but its use enhances the operation of the system and it is therefore preferable to include such a network in the circuit.

Figure 9:
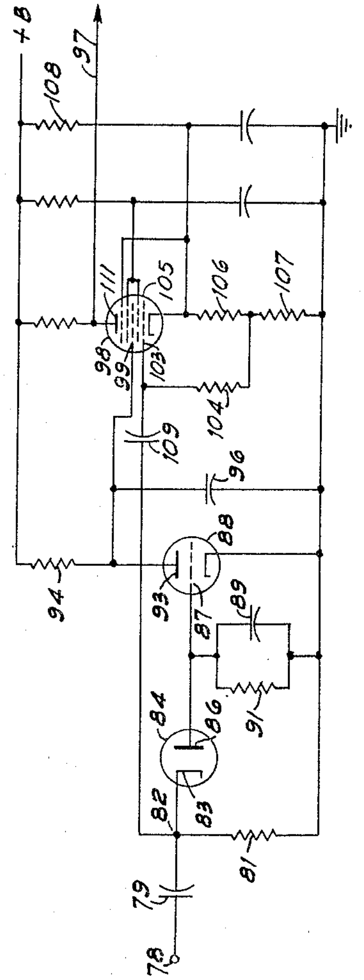

Fig. 9 illustrates an embodiment of the circuit of the instant invention which while requiring the additional use of a peak rectifier shapes the input waveform with even more precision. The input signal from the signal separator 17, Fig. 1 is received at the terminal 78, Fig. 9, and is applied to an isolating condenser 79 to remove any direct current component, while a resistor 81 is provided to stabilize the average potential level of the terminal 82. The time constant of the condenser 79 and resistor 81 is made so large that the combination has no differentiating action and the wave form at the output junction 82 is as is illustrated in Figs. 3 and 4.

Figure 10:
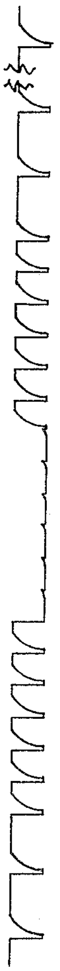
Figure 10 represents the wave form of the output of the diode in the circuit of Fig. 9.
Figure 11:
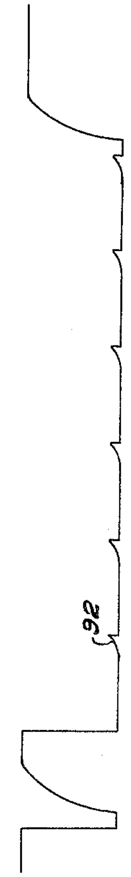
Figure 11 represents the wave form of Fig. 10 drawn to an enlarged scale.

This signal is applied to the cathode 83 of a diode 84 which acts as a peak rectifier, passing negative peaks from its anode 86 to the control grid 87 of a triode 88. A timing circuit composed of a condenser 89 and resistor 91 in shunt thereto whose time constant is made longer than the duration of a serration but shorter than the interval between two serrations, is connected between the anode 86 and ground. During the voltage-dropping parts of the incoming signal the diode is conductive so that the condenser 89 is in effect directly connected to the condenser 79 and discharges into it. The timing circuit 89, 91 thus has no effect in modifying signals of decreasing potential applied to the triode grid 87. However, when the incoming signal voltage is rising the diode cathode 83 is kept more positive than the anode 86, the diode is made non-conductive and the timing circuit is free to rise under control of its constants, applying a retarded signal to the grid 87 which is approximately the integral of the upward-rising portion of the incoming signal. This partially integrated signal is illustrated in Fig. 10 and enlarged in Fig. 11. As will be seen the serrations within the vertical synchronization pulse interval have been reduced to the insignificant cusps 92, Fig. 11, by this action of the diode rectifier and timing circuit and it is this wave form which is impressed on the grid 87 of the triode 88.

The triode 88 is normally conducting with the potential of its anode 93 nearly as low as that of its grid 87. However, during the passage of a negative pulse of potential through the diode 84 to the triode grid 87, the triode is made non-conducting and the potential of its anode 93 then commences to rise under control of the time constant of its anode resistor 94 and condenser 96. This time constant is made much longer than the length of a serration but is made small enough to have a large integrating effect during a vertical pulse interval, and therefore the anode potential rises progressively during a vertical pulse interval in the manner as indicated in Fig. 12.

Figure 12:
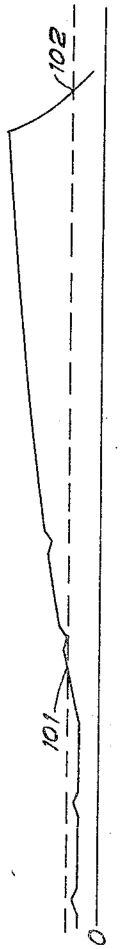
Figure 12 represents the output wave form of the triode of the circuit of Fig. 9.

Comparing Fig. 12 with Fig. 6 it is evident that the wave forms of the triode plate potentials produced by the circuits of Figs. 2 and 9 are very similar and the remainder of the circuit of Fig. 9 may be identical to that of Fig. 2 producing at the output conductor 97 an output as illustrated by the wave form of Fig. 8. To this end a multi-grid tube 98 is controlled through its third grid 99 by the potential of the anode 93 of the triode 88. This potential is above cutoff only between the times 101 and 102 as illustrated in Fig. 12. The first grid 103 is biased below cutoff through the resistor network consisting of the resistors 104, 106, 107 and 108 and is coupled to the input junction 82 through a condenser 109, the condenser 109 together with the resistors 104, 106, 107 and 108 constituting a differentiating network. The potential wave form impressed on the first grid 103 is that shown in Fig. 7 and the output potential form at the anode 111 of the multi-grid tube 105 is shown in Fig. 8. This output potential is transmitted through the connection 97 to the following circuit 19, Fig. 1.

It is obvious from an inspection of Figs. 6 and 7 that by changing the resistance of resistor 63, Fig. 2 (109, Fig. 9), thus changing the cutoff point of the first grid, some later pulse than that due to the first serration can be chosen as the first to rise above cutoff potential. No anode current pulse will then occur until the time of the chosen serration, when the marking pulse will occur.

The application of the wave form illustrated in Fig. 7 to the grid 56 of the tube 54 would produce extreme accuracy of vertical retrace without the concomitant action of the grid 64 to which the wave form illustrated in Fig. 6 is applied were it not for random noise impulses which may be of short duration and liable to occur at any time.

In the absence of the coincident control made possible by the use of grid 64 and its associated circuits a noise impulse having a time duration of approximately that of an equalizing pulse and occurring prior to the vertical synchronizing pulse interval might act through the condenser 68, resistor 57 and grid 56 to produce a vertical sweep triggering pulse and thus produce inaccurate and mistimed operation of the vertical retrace. However, by providing for a coincidence operation wherein the grid 56 has signal applied thereto through a differentiating network which has a time constant such that the equalizing pulses generally retain their original shape while the general signal level rises exponentially and gradually and the grid 64 has signal applied thereto through an integrating network which increases gradually only during the relatively long vertical synchronizing pulse interval, output pulses may be obtained from the anode circuit of the tube 54 only at those times during which a short, sharp pulse occurs after the beginning of the vertical synchronizing pulse interval. Thus short, sharp noise pulses occurring at ony other time have no effect and accuracy of operation is insured.

The first pulse to occur in the anode circuit of the tube 54 which is termed the marking pulse and is indicated for one case at 74 in Fig. 8, actuates the vertical sweep circuit 19, Fig. 1. As a vertical sweep circuit generally includes a triggering blocking oscillator circuit, its time measurement is initiated by the first pulse received and it ignores any pulses immediately following. The pulses immediately following the initial pulse 74, Fig. 8, therefore have no effect and their existence may be disregarded.

Any or all of the several resistance-capacitance circuits employed in this invention for the modification of an applied potential pulse in the manners which have herein been termed integration and differentiation can of course be replaced by resistance-inductance circuits to serve the same purposes, with appropriate changes in connections and in the resistance and reactance values as is well known in the art.

Although the operation of series and shunt resistance-capacitance combinations in these circuits has been referred to as "integration" or "differentiation," it is of course understood that a resistance-reactance circuit does not perform a pure integrating or differentiating operation, but produces a wave form which differs from the intergrated or differentiated applied form by a greater or less amount depending upon the size of its time constant.

What is claimed is:

1. A synchronization circuit for separating vertical synchronization signals from a television signal which includes a vertical synchronizing pulse interval containing serrations comprising, an integrating circuit having said television signal impressed thereon for integrating the signal received during said vertical synchronizing pulse interval, a normally conductive discharge tube having said integrated signal impressed on its input whereby the conductivity of said discharge tube is gradually decreased by said integrated signal and an amplified inverted output signal is produced thereby, an integrating circuit connected in the output of said discharge tube operative to integrate the output thereof only during the intervals of decreased conductivity thereof, a gating tube having at least two control electrodes, a circuit impressing the output of said discharge tube on one of said control electrodes and a circuit for impressing said television signal on another of said control electrodes said last mentioned circuit including a differentiating network.

2. A synchronizing circuit for separating vertical synchronizing signals from a television signal which includes a vertical synchronizing pulse interval containing serrations comprising, an integrating circuit having said television signal impressed thereon for integrating the signal received during said vertical synchronizing pulse interval, said integrating circuit having a time constant which is long compared to an equalizing pulse of said television signal and which is short compared to the vertical synchronizing pulse interval, a normally conductive discharge tube having said integrated signal impressed on its input whereby the conductivity of said discharge tube is gradually decreased by said integrated signal and a gradually increasing output signal is produced thereby, an integrating circuit connected in the output of said discharge tube having a time constant comparable in length to the duration of the vertical synchronizing pulse interval and operative to integrate the output of said tube only during the intervals of decreased conductivity thereof, a gating tube having at least two control electrodes, a circuit interconnecting the output of said discharge tube and one of said control electrodes, and a second circuit for impressing said television signal on another of said control electrodes, said second circuit including a differentiating network having a time constant which is large compared to the duration of a serration but small as compared to said vertical synchronizing pulse interval.

3. A circuit for separating vertical synchronizing signals from a composite television signal which includes said vertical synchronizing signals occurring during a vertical synchronizing pulse interval comprising, a resistance reactance integrating network having said television signal impressed on its input, a discharge tube having its input connected to the output of said integrating network, a resistor connected between the anode of said discharge tube and a source of positive potential, a condenser connected between said anode and the cathode of said discharge tube constituting together with said resistor an integrating circuit operative to integrate the amplified output of said discharge tube only when said discharge tube is relatively nonconductive, a gating tube having at least two control electrodes, a direct connection between the anode of said discharge tube and one of said control electrodes, a resistance reactance differentiating network having its input connected to the input of said first mentioned integrating network and its output connected to another of the control electrodes of said gating tube and a circuit for utilizing a selected vertical synchronizing signal connected to the output of said gating tube.

4. A circuit for separating vertical synchronizing signals from a composite television signal which includes vertical synchronizing signals occurring during a vertical synchronizing pulse interval comprising, a resistance reactance integrating network having a time constant which is long compared to an equalizing pulse of said television signal and which is short compared to the vertical synchronizing pulse interval thereof connected to have said television signal impressed on its input, a discharge tube having its input connected to the output of said integrating network, a resistor connected between the anode of said discharge tube and a source of positive potential, a condenser connected between said anode and the cathode of said discharge tube constituting together with said resistor an integrating circuit operative to integrate the amplified output of said discharge tube, said last mentioned integrating circuit having a time constant comparable in length to the duration of the vertical synchronizing pulse interval and operative only to integrate the output of said discharge tube during periods of relative non-conductivity of said discharge tube, a gating tube having at least two control electrodes one of which is connected to the junction of said resistor and condenser and the other of which is connected to the input of said first mentioned integrating network through a resistance reactive differentiating network having a time constant which is large compared to the duration of a vertical synchronizing signal but small as compared to the duration of the vertical synchronizing pulse interval and a circuit for utilizing a selected vertical synchronizing signal connected to the output of said gating tube.

LOUIS L. POURCIAU.
RICHARD W. LEE.

REFERENCES CITED

The following references are of record in the file of this patent:

UNITED STATES PATENTS

| Number | Name | Date |
|---|---|---|
| 2,211,942 | White | Aug. 20, 1940 |
| 2,227,630 | Carnahan | Jan. 7, 1941 |
| 2,295,346 | Jones et al. | Sept. 8, 1942 |

FOREIGN PATENTS

| Number | Country | Date |
|---|---|---|
| 529,790 | Great Britain | Nov. 28, 1940 |
| 841,045 | France | May 9, 1939 |
| 846,887 | France | Sept. 27, 1939 |
| 847,675 | France | Oct. 13, 1939 |